(12) United States Patent
Yamada

(10) Patent No.: US 10,065,646 B2
(45) Date of Patent: Sep. 4, 2018

(54) VEHICLE ENGINE STOP CONTROL DEVICE

(71) Applicant: Nissan Motor Co., Ltd., Yokohama-shi, Kanagawa (JP)

(72) Inventor: Ken Yamada, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/507,270

(22) PCT Filed: Sep. 2, 2014

(86) PCT No.: PCT/JP2014/073052
§ 371 (c)(1),
(2) Date: Feb. 28, 2017

(87) PCT Pub. No.: WO2016/035138
PCT Pub. Date: Mar. 10, 2016

(65) Prior Publication Data
US 2017/0291606 A1    Oct. 12, 2017

(51) Int. Cl.
*B60W 30/18*     (2012.01)
*F02D 29/02*     (2006.01)
*F02N 11/08*     (2006.01)

(52) U.S. Cl.
CPC .......... *B60W 30/18018* (2013.01); *B60W 30/18072* (2013.01); *F02D 29/02* (2013.01);
(Continued)

(58) Field of Classification Search
CPC ..... B60W 30/18018; B60W 30/18072; B60W 2520/12
See application file for complete search history.

(56) References Cited

U.S. PATENT DOCUMENTS 6,190,284 B1 *   2/2001   Kuroda ................ B60K 6/485
                                               123/179.4
6,335,573 B1 *   1/2002   Eguchi ................ B60K 6/485
                                               290/40 C
(Continued)

FOREIGN PATENT DOCUMENTS

JP       H07-42580 A     10/1995
JP       11-267121 A     10/1999
(Continued)

*Primary Examiner* — Edwin A Young
(74) *Attorney, Agent, or Firm* — Global IP Counselors, LLP

(57) ABSTRACT

An engine stop control device is provided for a vehicle that ensures a sufficient operation frequency of coast stop operation during travel on a congested road, thereby to improve practical fuel economy. The vehicle has an engine that is capable of being restarted. A controller is configured to stop the engine automatically when the vehicle, after experiencing a travel with a vehicle speed VSP exceeding a first threshold value, decreases the speed below a CS (coast stop) start vehicle speed. The controller is further configured to set a second threshold value below the first threshold value. The controller is further configured, after starting from an engine automatic stop due to the coast stop control and when the vehicle experiences travel exceeding the second threshold value without exceeding the first threshold value, to permit the automatic engine stop due to the coast stop control at least once.

13 Claims, 5 Drawing Sheets

(52) U.S. Cl.
CPC ..... *F02N 11/0833* (2013.01); *B60W 2520/12* (2013.01); *B60W 2550/30* (2013.01); *F02N 2200/0801* (2013.01); *H05K 999/99* (2013.01); *Y02T 10/48* (2013.01)

(56) References Cited

U.S. PATENT DOCUMENTS

| | | | | |
|---|---|---|---|---|
| 9,221,464 | B2* | 12/2015 | Goh | B60W 10/04 |
| 2012/0135839 | A1* | 5/2012 | Watanabe | B60W 30/18072 477/110 |

FOREIGN PATENT DOCUMENTS

| | | | |
|---|---|---|---|
| JP | 2003-35174 | A | 2/2003 |
| JP | 2006-083706 | A | 3/2006 |
| JP | 2006-152865 | A | 6/2006 |
| JP | 2012-67716 | A | 4/2012 |
| JP | 2014-196677 | A | 10/2014 |

\* cited by examiner

VEHICLE ENGINE STOP CONTROL DEVICE

CROSS-REFERENCE TO RELATED APPLICATIONS

This application is a U.S. National stage application of International Application No. PCT/JP2014/073052, filed Sep. 2, 2014.

BACKGROUND

Field of the Invention

The present invention relates to an engine stop control system equipped with an engine capable of being restarted as a driving source for performing a coast stop control to stop the engine automatically before stopping.

Background Information

Conventionally, an engine stop control system for a vehicle is known in which, after the vehicle experiences traveling at a vehicle speed above a threshold value, when the vehicle speed falls below an automatic stop permission vehicle speed, a coast stop control will be performed for automatically stopping the engine (for example, Japanese Laid-Open Patent Application No. H11-267121 A).

SUMMARY

However, in the conventional system, only one threshold is set as a threshold for the vehicle speed, and, after the engine is automatically stopped by the coast stop control, unless the vehicle experiences a vehicle speed exceeding the threshold after restart, the following automatic engine stop does not take place. Therefore, there is a problem that fuel economy effect is hardly obtained in a congested road traveling scene in which acceleration and deceleration in the low speed range continue without the vehicle speed exceeding the threshold value.

The present invention has been made in view of the above problem, and aims to provide an engine stop control system for a vehicle to improve fuel economy by ensuring the operation frequency of the coast stop control in the congested road traffic situation.

To achieve the above object, the present invention comprises a coast stop control unit is provided and configured to stop the engine automatically, after the vehicle experiences travel with a vehicle speed exceeding a first threshold, when the vehicle speed falls to or below the automatic stop permission vehicle speed due to decrease in the vehicle speed. The coast stop control unit further comprises a vehicle speed threshold setting unit configured to set a second threshold less than the first threshold and to allow the automatic engine stop at least once by the coast stop, after starting from the automatic engine stop by the coast stop control and subsequently experiencing travel exceeding the second threshold during travel without exceeding the first threshold.

In the present coast stop control, after the vehicle experiences travel greater than a first threshold, when the vehicle speed becomes equal to or less than the automatic stop permission vehicle speed due to decrease in the vehicle speed, the engine is automatically stopped. Thus, the engine is automatically stopped during an initial vehicle deceleration in the scene of a congested road. However, after subsequent start of the engine, as long as the vehicle does not experience travel exceeding the first threshold, the automatic stop of the engine does not operate in principle. In contrast, even in congested road scene in which the vehicle travels at a speed not exceeding the first threshold, when the vehicle experiences travel exceeding the second threshold lower than the first threshold, the automatic engine stop will be permitted at least once by the coast stop control. As a result, in the congested road traveling scene, by securing the operating frequency of the coast stop control, it is possible to improve the fuel economy.

DETAILED DESCRIPTION OF THE EMBODIMENTS

Figure 1:
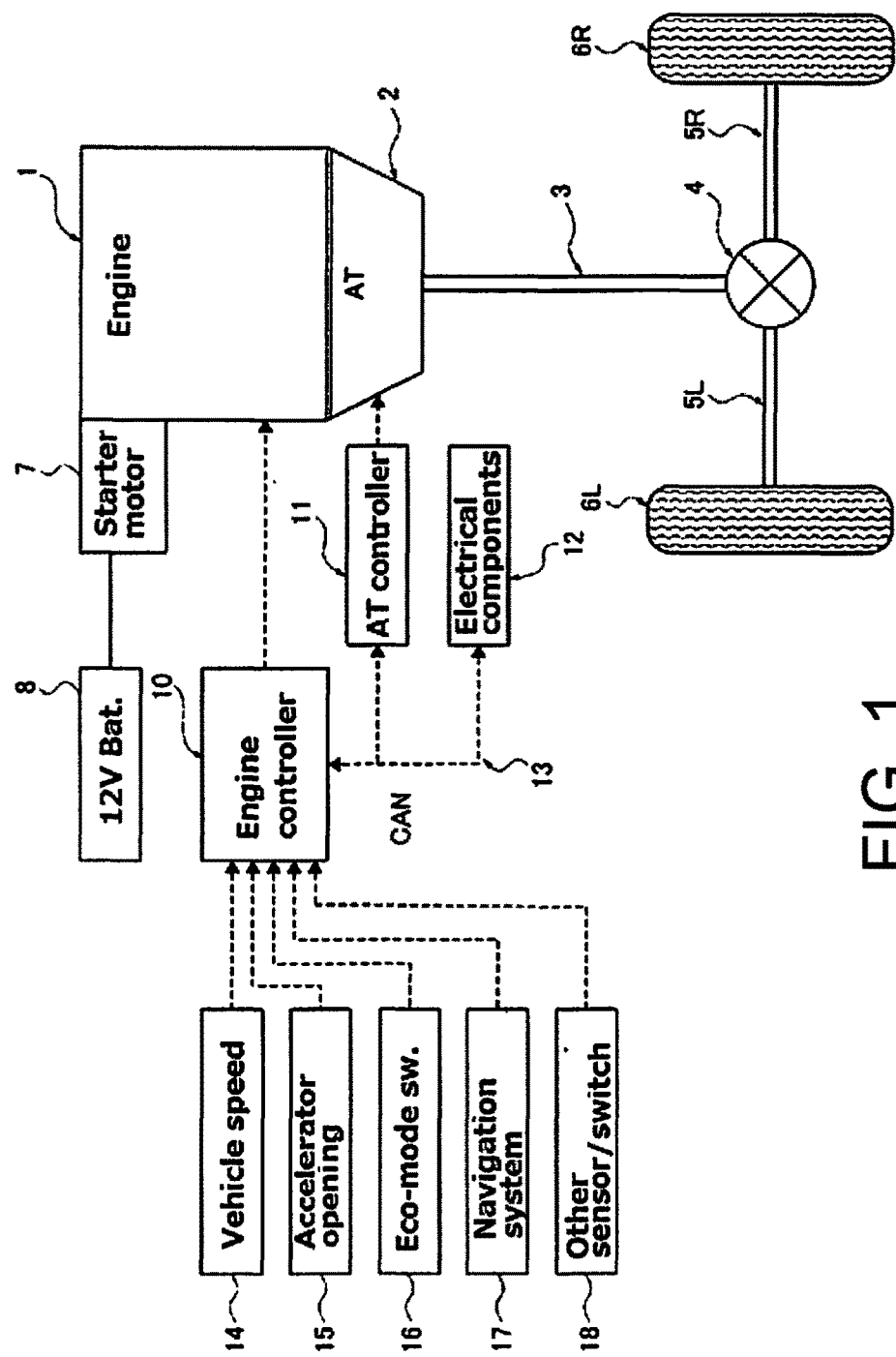
FIG. 1 is an overall system diagram showing an engine equipped vehicle to which an engine stop control system in a first embodiment is applied.

Below, the best mode for implementing the engine stop control system for a vehicle according to the present invention will be described with reference to a first embodiment shown in the drawings.

First Embodiment

First, a description is given of the configuration. The construction of the engine stop control system for a vehicle in the first embodiment will be described separately in the "overall system configuration" and "coast stop control process configuration".

Overall System Configuration

FIG. 1 shows an engine equipped vehicle to which the engine stop control system in the first embodiment is applied. Below, a description is given of the overall system configuration with reference to FIG. 1.

As shown in FIG. 1, the drive system of the engine equipped vehicle is provided with an engine 1, an automatic transmission 2, a propeller shaft 3, a differential 4, left and right drive shafts 5L, 5R, and left and right drive wheels 6L, 6R.

The engine 1 is provided with a starter motor 7 for starting the engine 1 at times of vehicle start or start of the engine which is stopped by the coast stop. The starter motor 7 is powered by a vehicle-mounted 12V battery 8.

As shown in FIG. 1, in a control system of the engine vehicle, an engine controller 10, an AT controller 11, a vehicle electrical equipment 12, are provided. These control system devices are connected to each other by CAN communication 13 for exchanging information in both directions.

The engine controller 10 receives necessary information from a vehicle speed sensor 14, an accelerator opening sensor 15, an eco-mode switch 16, a navigation system 17, and other sensors and switches 18. Further, based on the information thus received, an engine fuel control (fuel cutoff/fuel recovery) and a coast stop control (automatic engine stop/engine restart) are performed. It should be noted that, the engine controller receives from the eco-mode switch 16 information as to whether or not the vehicle is traveling with the eco driving mode being selected. Also, the engine controller receives from the navigation system 17 congestion level information in the travel path of the vehicle.

The AT controller 11, using a shift map which is set in advance, performs a shift control of the automatic transmission 2 in accordance with the driving point determined by the vehicle speed VSP and accelerator opening APO.

Coast Stop Control Process Configuration

Figure 2:
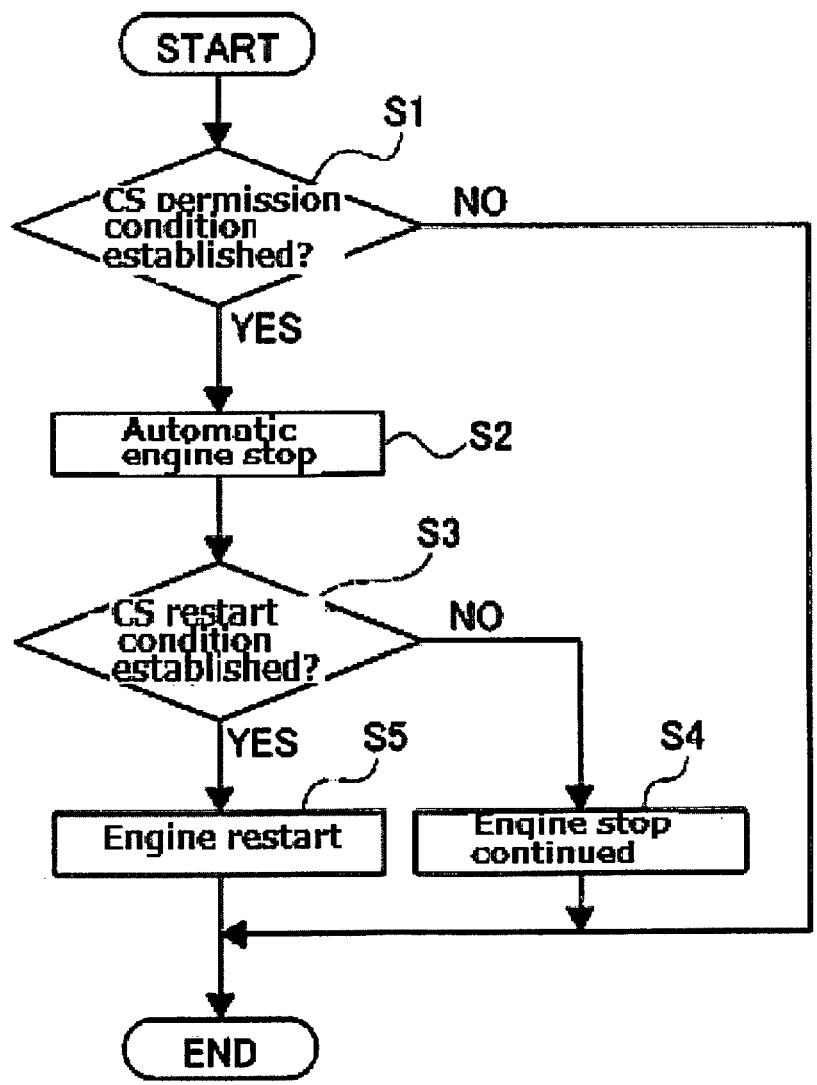
FIG. 2 is an overall flow chart showing the flow of a coast stop control process executed by the engine controller in the engine stop control system of the first embodiment.

FIG. 2 shows a flow of the coast stop control process executed by the engine controller in the engine stop control unit (coast stop control mechanism). Below, a description will be given of each step representing the coast stop control process configuration. Note that "CS" stands for an abbreviation for coast stop.

In step S1, it is determined whether or not a CS permission condition for permitting the coast stop control is satisfied. If YES (CS permission condition is satisfied), control proceeds to step S2, whereas in the case of NO (CS permission condition is not satisfied), control goes to End. Here, in order for the CS permission condition to be satisfied, the automatic engine stop is permitted at least in the flowchart of FIG. 3. More specifically, the condition is satisfied when the vehicle, after experiencing a travel at a vehicle speed VSP exceeding a first threshold, slows down, and the vehicle speed VSP falls to or below a CS starting vehicle speed (=automatic stop permission vehicle speed). In addition, the condition may also be satisfied, when, after the automatic engine stop has been operated, the vehicle experiences a travel at a vehicle speed VSP exceeding a second threshold without exceeding the first threshold during the travel, and the vehicle speed VSP subsequently falls below the CS starting vehicle speed with the number of CS operations below a permitted number of times.

In step S2, subsequent to the determination that the CS permission condition is satisfied in step S1, the engine 1 is automatically stopped by fuel cutoff, and control proceeds to step S3.

In step S3, following the automatic engine stop at step S2, it is determined whether or not a CS restart condition is established to restart the engine 1 by stopping the coast stop control. If YES (CS restart condition is satisfied), control proceeds to step S5. In the case of NO (CS restart condition is not satisfied), control goes to step S4. Here, the establishment of the CS restart condition refers to a driver's starting intention from the stopped state such as a brake foot release operation, an accelerator depression start operation, and a select operation in a driving range.

In step S4, subsequent to the determination in step S3 that the CS restart condition is not established, the engine 1 continues to be stopped, and process proceeds to the end.

In step S5, following the determination in step S3 that the CS restart condition is satisfied, the engine 1 will be restarted by driving the starter motor 7, and control goes to the end.

Figure 3:
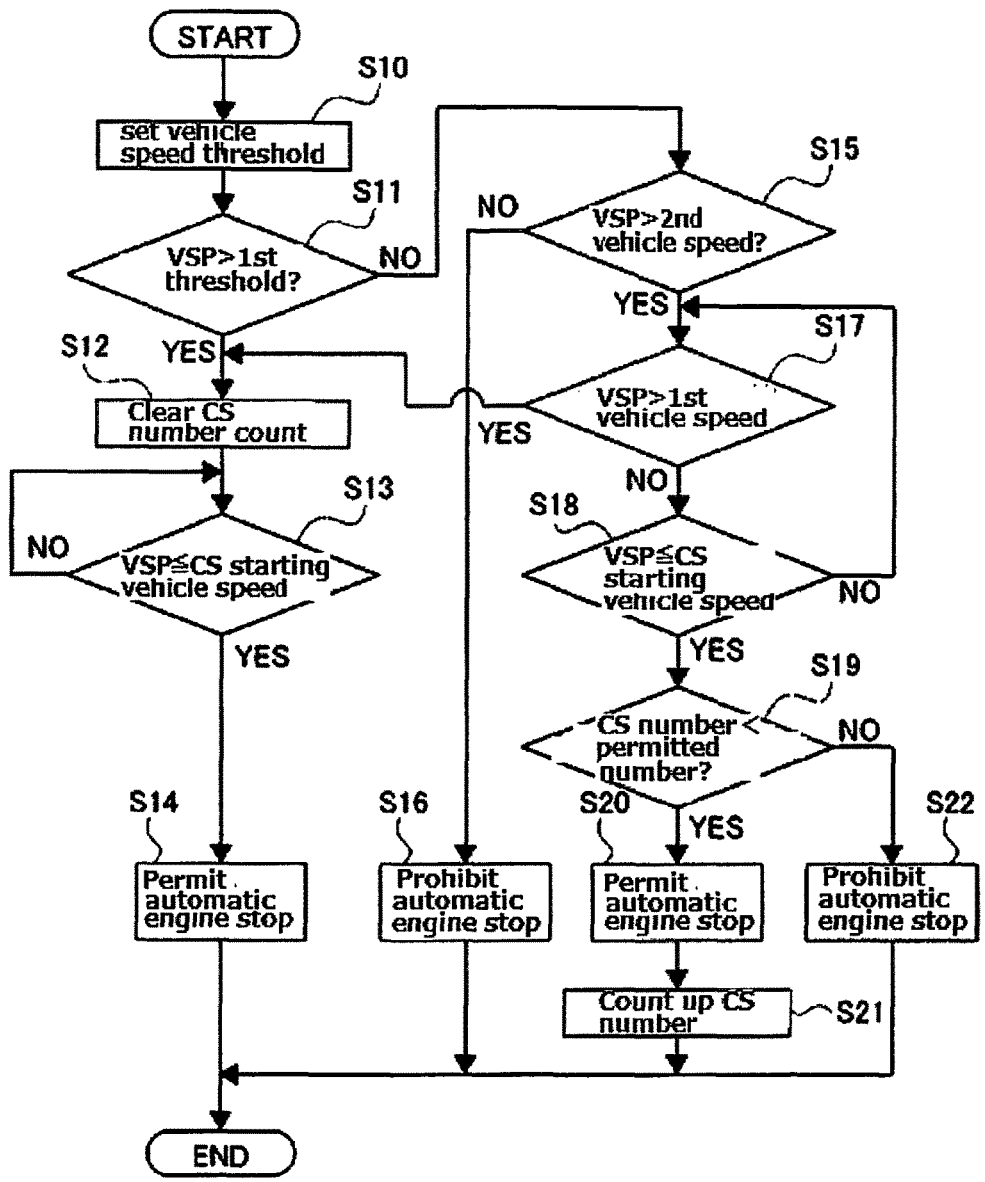
FIG. 3 is a flowchart showing a flow of permission/prohibition determination process of automatic engine stop, which forms part of the CS permission conditions in the coast stop control process in the first embodiment.

FIG. 3 shows a flow of permission/prohibition determination process of automatic engine stop, which is part of the CS permission condition in the coast stop control process in the first embodiment (coast stop control mechanism). Below, a description is given of each step in FIG. 3 representing the permission/prohibition determination process configuration of the engine automatic stop.

In step S10, following the starting operation, the first threshold and the second threshold representing the vehicle speed threshold values are determined, and control proceeds to step S11. Here, the first threshold is set to a vehicle speed value that would not be reached during congestion traveling in which start/stop is repeated (e.g., about 20~30 km/h). The second threshold value is set to a vehicle speed value lower than the first threshold value, and is higher than the CS start vehicle speed, and is set to such vehicle speed value that may be experienced in the congested travel to repeat the start/stop (e.g., 10~about 15 km/h). Further, the second threshold value is set, when the selection information of eco-drive mode from the eco mode switch 16 is received and the eco-drive mode is actually selected, to a lower vehicle speed value as compared to when the eco-drive mode is not selected.

In step S11, following the setting of the vehicle speed threshold values in step S10, it is determined whether or not the vehicle speed VSP exceeds the first threshold value. If YES (VSP>first threshold), control proceeds to step S12. In the case of NO (VSP≤first threshold), control proceeds to step S15.

In step S12, subsequent to the determination in either step S11 or step S17 that VSP>first threshold, the number of coast stop control operations (=counts) due to the count up operation is step S21 is cleared, and control proceeds to step S13.

In step S13, following the CS number count clearance execution in step S12, it is determined whether or not the vehicle speed VSP is equal to or below the CS starting vehicle speed (=automatic stop permission vehicle speed). If YES (VSP≤CS starting vehicle speed), control proceeds to step S14. In the case of NO (VSP>CS starting vehicle speed), the determination in step S13 will be repeated. Here, as the CS starting vehicle speed is set to a vehicle speed value at which an automatic engine stop just before stopping of the vehicle would not cause problems (e.g., at vehicle speed of about 8 km/h).

In step S14, subsequent to the determination in step S13 that VSP≤CS starting speed, the automatic engine stop is permitted, and control proceeds to the end.

In step S15, subsequent to the determination in step S11 that VSP≤first threshold value, it is determined whether or not the vehicle speed VSP exceeds the second threshold value. If YES (VSP>second threshold), control proceeds to step S17. In the case of NO (VSP≤second threshold), control proceeds to step S16.

In step S16, subsequent to the determination in step S15 that VSP≤second threshold, the automatic engine stop is prohibited, and control proceeds to the end.

In step S17, following the determination in step S15 that VSP>second threshold, or the determination in step S18 that VSP>CS starting speed, it is determined whether or not the vehicle speed VSP exceeds the first threshold. If YES (VSP>first threshold), control proceeds to step S12. In the case of NO (VSP≤first threshold), control proceeds to step S18.

In step S18, subsequent to the determination in step S17 that VSP≤first threshold, it is determined whether or not the vehicle speed VSP is equal to or below the CS starting vehicle speed (=automatic stop permission vehicle speed). If YES (VSP≤CS starting vehicle speed), control proceeds to step S19. In the case of NO (VSP>CS starting vehicle speed), control returns to step S17. Here, as the CS starting vehicle speed, the same value is used as the CS starting vehicle speed in step S13.

In step S19, subsequent to the determination in step S18 that VSP≤CS starting speed, it is determined whether or not the CS number representing the operation number of the coast stop control is equal to or less than the number of stops permitted. If YES (CS number≤permitted number), control proceeds to step S20. In the case of NO (CS number>permitted number), control goes to step S22. Here, the permitted number is represented by a basic number of times and given in a fixed value such as permitted number being equal to "1" (to allow CS once while prohibiting two or more CSs). Further, the congestion information of the road from the navigation system 17 is received, and the permitted number increases as the congestion degree become smoother. In addition, the selection information of eco-drive mode from the eco-mode switch 16 is receive, and, when selecting the eco-travel mode, the permitted number increases when the eco-drive mode is being selected compared to when the eco-drive mode is not selected.

In step S20, subsequent to the determination in step S19 that CS number permitted number, the automatic engine stop is permitted, and control proceeds to step S21.

In step S21, followed the automatic engine stop permission in step S20, the CS number is counted up, representing the number of times for operation of the coast stop control, and control goes to the end.

In step S22, subsequent to the determination in step S19 that CS number>permitted number, the automatic engine stop is prohibited, and control proceeds to the end.

Figure 4:
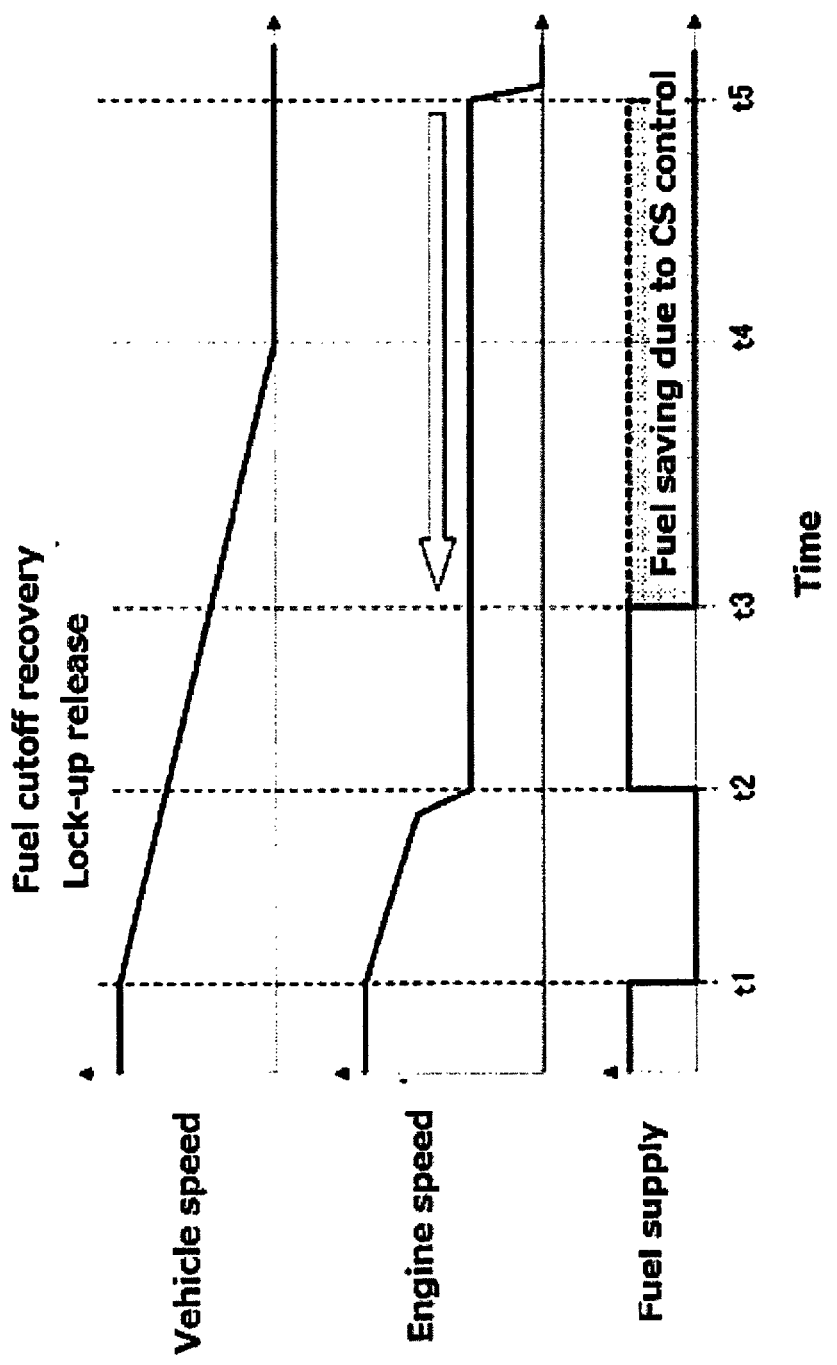
FIG. 4 is a time chart showing respective characteristics of vehicle speed, engine speed, fuel during deceleration stop in which the coast stop control is performed by the engine stop control system in the engine equipped vehicle in the first embodiment.

Now, a description will be made of operations. A description is given of the operation of the engine stop control system for an engine equipped vehicle in the first embodiment, separately, i.e., in "Operations of coast stop control and idling stop control by comparison", "Coast stop control process operation", "Coast stop control operation in congested road traveling scene", and "Other feature operations".
Operations of Coast Stop Control and Idling Stop Control by Comparison Below, with reference to a time chart shown in FIG. 4, a description is given of the coast stop control and the idle stop control during deceleration to a stop at the accelerator OFF/brake ON operation. In FIG. 4, time t1 represents a time of accelerator OFF/brake ON/fuel cutoff, time t2 represents a time of fuel cutoff recovery & lock-up release, time t3 represents a time of coast stop control start, time t4 represents a vehicle stop time, and time t5 represents a time of idle stop control start, respectively.

During deceleration to vehicle stop with the accelerator OFF/brake ON operation, at time t1, the fuel cutoff is started. At time t2, the fuel cutoff recovery and torque converter lock-up clutch release are performed. In other words, the period from time t1 to time t2 represents a fuel cutoff period, and at time t2 and thereafter the fuel injection state will be resumed. Up until time t2, the difference between the coast stop control and the idle stop control would not make changes.

However, in the case of the coast stop control, at time t3 when the vehicle speed is lowered to the CS starting vehicle speed, the engine automatic stop control by the fuel cut is started. On the other hand, in the case of the idle stop control, after, at time t5, after waiting establishment of the control start condition subsequent to reaching the vehicle stop time t4, the automatic engine stop control by the fuel cut is started. Thus, in the coast stop control, compared to the case of the idle stop control, the timing of the engine automatic stop control by the fuel cut is started at an earlier stage, thus expanding the fuel efficiency by idle stop control. That is, the fuel reduction amount obtained between time t3 and time t5 exhibits an enlarged effect of fuel consumption by the coast stop control.
Coast Stop Control Process Operation As described above, a description will be given of an overall coast stop control to further improve fuel economy effect due to idling stop control with reference to the flowchart shown in FIG. 2.

For example, after the vehicle speed VSP experiences travel exceeding the first threshold, when the vehicle speed VSP falls below the CS starting vehicle speed so as to satisfy the CS permission condition due to deceleration operation, control proceeds to step S2 from step S1 in the flowchart of FIG. 2. In step S2, the engine 1 is automatically stopped by fuel cutoff operation. When the automatic engine stop state is in place, control proceeds to step S3, where it is determined whether or not the CS restart condition is satisfied. While it is determined that the CS restart condition is not satisfied, in the flowchart of FIG. 2, the flow from step S1 to step S4 through step S2, step S3 is repeated. In step S4, stopping of the engine 1 is continued.

Subsequently, when establishment of the CS restart condition is confirmed in step S3 based on the driver's starting intention such as a brake foot release operation, an accelerator depression start operation, and a select operation in a driving range, control proceeds from step S3 to step S5. In step S5, the engine 1 is restarted by driving the starter motor 7. Thus, in the coast stop control, during the period from the time in which the CS permission condition is satisfied until the time in which the CS restart condition is satisfied, stopping of the engine 1 is continued.

Now, a description will be given of the permission/prohibition determination process operation of automatic engine stop in coast stop control with reference to the flowchart shown in FIG. 3. After a vehicle start, when the vehicle experiences a travel at a vehicle speed VSP exceeding the first threshold, control proceeds from step S10 to step S13 via steps S11, S12. More specifically, in step S11, when it is determined that the vehicle speed VSP exceeds the first threshold, in step S12, the CS number count is cleared, and in step S13, it is determined whether or not the vehicle speed VSP is equal to or below the CS starting vehicle speed. Subsequently, control proceeds to deceleration stop traveling, and in step S13, when it is determined that the vehicle speed VSP is equal to or less than the CS starting vehicle speed, control proceeds from step S14 to the end. In step S14, the engine automatic stop is permitted, and the coast stop control will operate.

After experiencing the engine automatic stop by the operation of the coast stop control, as long as the vehicle speed VSP remains equal to or less than the second threshold value, in the flowchart of FIG. 3, the flow from step S10 to the end via steps S11, S15, and S16 is repeated. In step S16, the automatic engine stop is prohibited. Thereafter, when the vehicle experiences vehicle speed VSP exceeding the second threshold, control proceeds from step S15 to step S18 via step S17 so that the flow advancing to steps S17, S18 will be repeated until it is determined that VSP≤CS starting vehicle speed. In step S18, it is determined whether or not the vehicle speed VSP falls below the CS start vehicle speed while maintaining the travel at vehicle speed below the first threshold. Note that, after the vehicle speed VSP experiences a travel exceeding the second threshold in step S15, and, for example, by escaping from the congestion state, when the vehicle speed VSP is determined to exceed the first threshold in step S17, control proceeds from step S17 to step S12 to return to the coast stop control at the time of deceleration stop in the normal traveling.

When the vehicle travels on a congested road without exceeding the first threshold although the vehicle speed VSP has experienced to exceed the second threshold, so that it is determined in step S18 that the VSP≤CS starting vehicle speed, control proceeds from step S18 to step S19. In step S19, it is determined whether or not the CS number of times representing the number of operations of coast stop control is less a permitted number. In the case of CS number≤permitted number, control proceeds to step S20, and an automatic engine stop is permitted. In the next step S21, the CS number of times representing the number of operations of the coast stop control is counted up, and control goes to the end. On the other hand, when the operation number of coast stop control exceeds the permitted number so that it is determined in step S19 that CS number>permitted number, control proceeds from step S19 to the end via step S22. In step S22, the engine automatic stop is inhibited.

Thus, in the first embodiment, as a principle, unless the vehicle experiences vehicle speed VSP exceeding the first threshold, the automatic engine stop will not be permitted. However, in the exceptional situation where the vehicle experiences the vehicle speed VSP exceeding the second threshold without exceeding the first threshold, the automatic engine stop will be permitted. Note that, although the number of times the automatic engine stop exception is permitted depends on the setting of the permitted number, the automatic engine stop is permitted at least once.

Coast Stop Control Operation in Congested Road Traveling Scene

Figure 5:
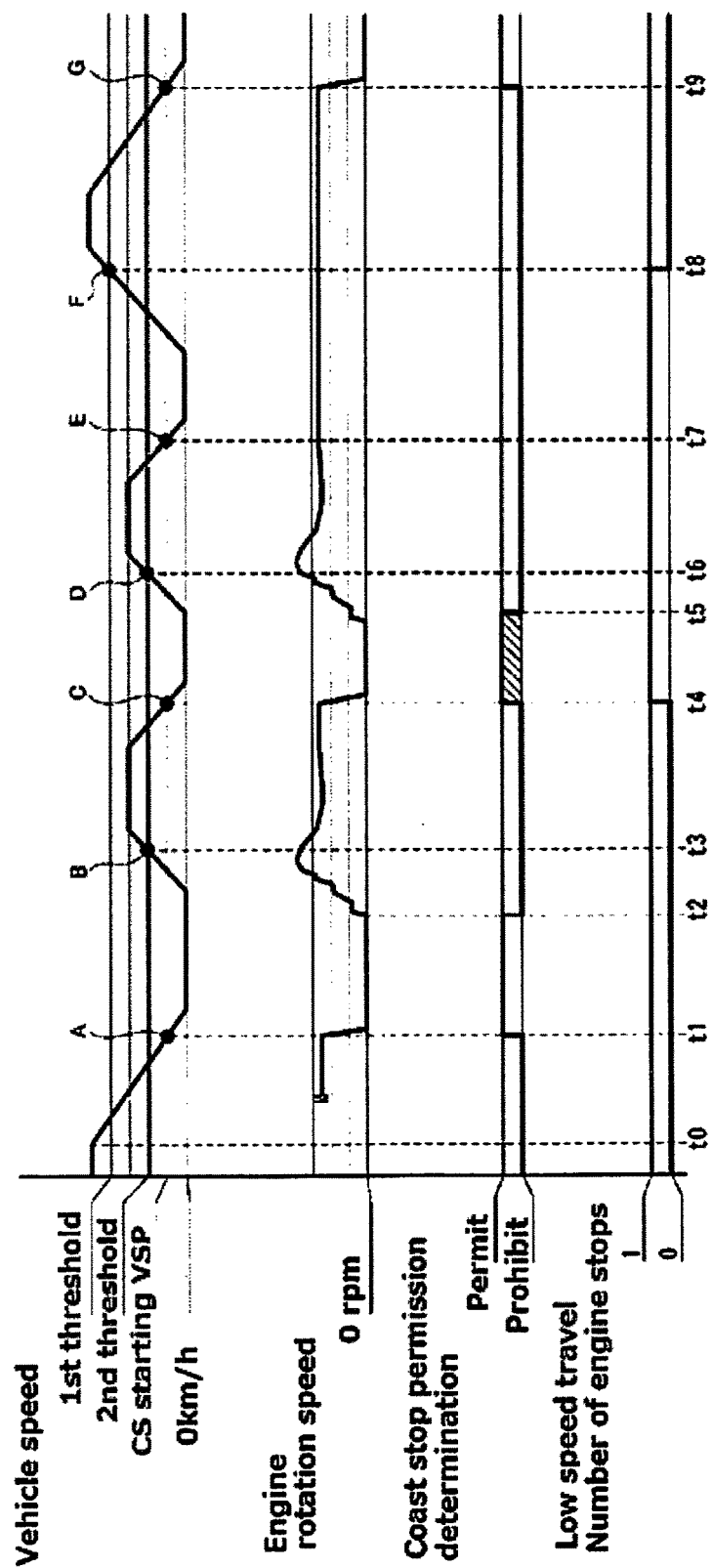
FIG. 5 is a diagram showing a time chart showing respective characteristics of the vehicle speed, engine speed, coast stop permission determination, and number of engine stopping during low speed travel.

Below, with reference to the time chart shown in FIG. 5, a description is now given of the coast stop control operation in congested road traveling scene.

After the vehicle speed VSP is experienced traveling in excess of the first threshold, when the deceleration operation is in place at time t0 by entering the congested road, the vehicle speed VSP starts lowering from time t0. Then, at a vehicle speed point A at time t1, when the vehicle speed becomes equal to or lower than the CS start vehicle speed, the engine automatic stop is permitted, and the engine 1 is automatically stopped from time t1 to time t2.

Thereafter, during a traveling scene in a congested road, which would not cause the vehicle speed to exceed the first threshold, the vehicle experiences to travel at the vehicle speed VSP exceeding the second threshold at a vehicle speed point B at time t3 (first time). Then, when the vehicle speed VSP becomes equal to or less than the CS start vehicle speed at speed point C, at time t4, the engine automatic stop is permitted, and the engine 1 is automatically stopped from time t4 to time t5. From time t4 on, the number of times of engine stop at low speed travel is rewritten to "1".

Subsequently, during a traveling scene in a congested road, which would not cause the vehicle speed to exceed the first threshold, the vehicle experiences to travel at the vehicle speed VSP exceeding the second threshold at a vehicle speed point D at time t6 (second time). Then, even when the vehicle speed VSP becomes equal to or less than the start vehicle speed at speed point E, at time t7, the engine automatic stop is prohibited. This is attributable to the situation in which the number of times of engine stop at low speed travel has been rewritten to 1 from time t4.

Then, due to escape of the congested road scene, when the vehicle speed VSP experiences travel at the vehicle speed VSP exceeding the first threshold at vehicle speed point F of time t8, the number of times "1" of engine stop at low speed travel which has been effective until time t8 is now rewritten to "0". Accordingly, when the vehicle speed VSP becomes equal to or less than the CS start vehicle speed at speed point G at time t9, the engine automatic stop is permitted to stop the engine 1 automatically at time t9.

As described above, in the first embodiment, it is configured to allow the automatic engine stop at least once by the coast stop, after a vehicle start from the automatic engine stop by the coast stop control and subsequently experiencing travel exceeding the second threshold during travel without exceeding the first threshold. That is, in the coast stop control, after the vehicle speed VSP is experienced to travel exceeding the first threshold value, when the vehicle speed VSP decreases below the CS start speed, the engine will be automatically stopped (time period between time t1 and time t2, FIG. 5). Thus, even in the congested road, when the vehicle enters the scene of first deceleration, the engine 1 is stopped automatically. However, after a subsequent startup, unless the vehicle experiences the vehicle speed VSP exceeding the first threshold value, the automatic engine stop operation does not occur. In contrast, even in congested road scene in which the vehicle travels at the vehicle speed VSP not exceeding the first threshold, when experiencing to travel at the vehicle speed exceeding the second threshold value which is lower than the first threshold, the automatic engine stop is permitted at least once due to the coast stop control (time t4 to t5 in FIG. 5). Thus, in the congested road traveling scene by securing the operating number or frequency of the coast stop control, it is possible to improve the fuel economy.

Other Feature Operation

In the first embodiment, the first threshold is configured to be set to a vehicle speed value which is unlikely reached during congestion traveling with repeated starting/stopping operations. That is, if the first threshold value is set to such a vehicle speed value of too low-speed side, although the operation frequency of the coast stop control may be assured, the coast stop operations at higher frequency than necessary in congested road traveling scene, a sense of discomfort will be imparted to the driver. In contrast, by setting the first threshold to the vehicle speed value which is unlikely to be reached during congestion traveling, it is possible to prevent the coast stop control from operating unnecessarily during congested road traveling to avoid giving discomfort to the driver.

In the first embodiment, the second threshold value is configured to assume the vehicle speed value slower than the first threshold value, and is faster than the CS start vehicle speed, so that the second threshold value may be experienced in the congested travel with repeated starting/stopping operations. That is, by setting the second threshold to the vehicle speed value too closer to the first threshold value, the traveling experience with vehicle speed exceeding the second threshold value in a congested road traveling scene would be rare. On the other hand, setting the second threshold to the vehicle speed value too closer to the CS start vehicle speed, frequency of travel experience with vehicle speed exceeding the second threshold value in a congested road traveling scene would be too large. In contrast, by setting the second threshold value to the vehicle speed value that may be experienced during the congestion traveling, it is possible to ensure the operation frequency of the coast stop control at the aimed frequency at congested road traveling scene.

In the first embodiment, the selection information about eco-drive mode is received, and the second threshold value is configured to be lower when selecting the eco-drive mode than when the eco-drive mode is not selected. In other words, when the selection of the eco-drive mode, the fuel economy requirements of the driver will prevail than the sense of discomfort given to the driver. Accordingly, it is possible to achieve to improve the fuel economy in response to driver demand when the eco-drive mode is selected and the second threshold value decreased.

In the first embodiment, it is configured such that the congestion information of the traveling path is received, and the permitted number of automatic engine stops due to coast stop control will increase as the congestion degree is smoother or moderate. That is, in the case of severe congested road traveling scene, with a short inter-vehicle distance, starting and stopping operations to cross the CS start vehicle speed are repeated frequently, which would give an uncomfortable feeling to the driver when the permitted number of the automatic engine stops is to be increased.

On the other hand, in the congestion road traveling scene with a gradual congestion degree, the inter-vehicle distance is long, and the time interval of the starting and stopping operations across the CS start vehicle speed will be longer. Accordingly, when the congestion degree is gradual, by increasing the number of permitted automatic engine stop, without giving an uncomfortable feeling to the driver, it is possible to improve the fuel economy.

In the first embodiment, the selection information of the eco-drive mode is received, and the permitted number of times of the automatic engine stop due to coast stop control is increased when the eco-drive mode is selected compared to the case in which the eco-drive mode is not selected. In other words, at the time of selection of the eco-drive mode, the fuel economy requirements of the driver will prevail over the sense of discomfort given to the driver. Thus, at selection of the eco-drive mode, by increasing the number of permitted automatic engine stop, it is possible to meet the driver's request to improve the fuel economy.

Now, a description will be given of effects. In the engine stop control system for an engine equipped vehicle in the first embodiment, it is possible to obtain the following effects.

(1) An engine stop control system for a vehicle equipped with an engine 1 (engine equipped vehicle), as a drive source, that is capable of being restarted, the engine stop control system comprising: a coast stop control unit (FIG. 3) configured to stop the engine 1 automatically when a vehicle speed VSP falls to or below an automatic stop permission speed (CS start vehicle speed) due to decrease in the vehicle speed after the vehicle has experienced a travel exceeding a first threshold value, the coast stop control unit (FIG. 3) further comprising: a vehicle speed threshold setting unit (S10) configured to set a second threshold value that is less than the first threshold value, wherein, after start from an engine automatic stop due to a coast stop control, when the vehicle experiences travel with the vehicle speed exceeding the second threshold value without exceeding the first threshold value, the engine automatic stop is permitted (S20) at least once due to the coast stop. Therefore, in a congestion road traffic scene, by ensuring the operation frequency of the coast stop control, it is possible to improve the fuel economy.

(2) The vehicle speed threshold value setting unit (S10, FIG. 3) is configured to set the first threshold value to a vehicle speed which would not be reached during travel in traffic congestion with repeated starting/stopping of the vehicle. Therefore, in addition to the effect of (1), it is possible to prevent the coast stop control from operating unnecessarily, which would impart discomfort to the driver in a traffic jam road scene (1).

(3) The vehicle speed threshold value setting unit (S10, FIG. 3) is configured to set the second threshold value to a vehicle speed that is below the first threshold value and above the automatic stop permission vehicle speed and is experienced by the vehicle during travel in a traffic congestion with repeated starting/stopping of the vehicle. Therefore, in addition to the effect of (2), it is possible to ensure the operation frequency of the coast stop control aimed at in a congested road traveling scene.

(4) The vehicle speed threshold value setting unit (S10, FIG. 3) is configured to receive information about selection of eco-drive mode, and when the eco-drive mode is selected, to set the second threshold value to a vehicle speed value lower than when not selected. Therefore, in addition to the effect of (3), it is possible at the time of the eco-drive mode selection, to set the second threshold lower so as to achieve improvement of fuel economy in response to the driver's request.

(5) The coast stop control unit (FIG. 3) is configured to receive traffic information about a congestion degree and to increase the number of automatic engine stops permitted as the congestion degree is lighter (S19). Therefore, in addition to the effects of (1) to (4), when the congestion degree is smooth or gradual, by increasing the number of permitted automatic engine stops, without giving an uncomfortable feeling to the driver, fuel economy can be improved.

(6) The engine stop control device (FIG. 3) for a vehicle according to any one of claims 1 to 5, wherein the coast stop control unit is configured to receive information about selection of eco-drive mode, and when the eco-drive mode is selected, to increase the number of automatic engine stops permitted due to the coast stop control than when not being selected (S19). Therefore, in addition to the effects of (1) to (5), at the time of the eco-drive mode selection, by increasing the number of permitted automatic engine stops, it is possible to meet the driver's request to improve the fuel economy.

Although the engine stop control system for a vehicle according to the present invention has been described based on the first embodiment, the specific configuration is not limited to this embodiment. Rather, according to each claim of claims, additions and changes in design are acceptable without departing from the gist of the present invention.

In the first embodiment, the vehicle speed threshold setting unit is configured to set the first threshold value that would not be reached during congestion traveling in which start/stop is repeated. Also, the second threshold value is set to a vehicle speed value lower than the first threshold value, and is higher than the CS start vehicle speed, and is set to such vehicle speed value that may be experienced in the congested travel to repeat the start/stop. Further, the second threshold value is set, when the eco-drive mode is selected, to a lower vehicle speed value as compared to when the eco-drive mode is not selected. However, in one example, the vehicle speed threshold value setting unit may be configured to give both the first and second threshold values in fixed values. In another example, both the first and second threshold values may be given in variable values, which are subject to change in accordance with the running environment information and the operating information unique to the specific driver other than the selection information of the eco-drive mode.

In the first embodiment, the coast stop control unit is configured to allow the automatic engine stop at least once by the coast stop, after starting from the automatic engine stop by the coast stop control and subsequently experiencing travel exceeding the second threshold during travel without exceeding the first threshold. Further, an example is shown in which, as the congestion degree is gentle, or the eco-drive mode is being selected, the permitted number will increase. However, the coast stop control unit may be configured in an example of a predetermined, fixed number for engine stop control. Further, according to the traveling scene which is determined based on information other than the congestion degree information and the eco-drive mode selection information, the permitted number may be variably set.

In the first embodiment, an example is shown in which the engine stop control system according to the present invention is applied to an engine equipped vehicle. However, the engine stop control system may be applied to a hybrid vehicle having an engine as a driving source. In short, the present invention is applicable when the vehicle is equipped with an engine as a driving source which is capable of being restarted.

The invention claimed is:

1. A vehicle engine stop control device for a vehicle equipped with an engine, as a drive source, capable of being restarted, the vehicle engine stop control device comprising:
a controller programmed to execute a coast stop control configured to
stop the engine automatically during travel when a vehicle speed of the vehicle becomes equal to or smaller than an automatic stop permission vehicle speed after the vehicle speed has exceeded a first threshold value, and to restart the engine when a restart condition is established after the engine has been stopped automatically, and, after restart of the engine, to prohibit the engine from being stopped automatically until the vehicle speed exceeds the first threshold value,
permit the engine to be stopped automatically even though the vehicle speed has not exceeded the first threshold value when the vehicle speed becomes equal to or smaller than the automatic stop permission vehicle speed after the vehicle speed has exceeded a second threshold value that is below the first threshold value,
prohibit the engine from being stopped automatically when a number of times the engine has been stopped automatically in response to the vehicle speed becoming equal to or smaller than the automatic stop permission vehicle speed after exceeding the second threshold value has reached a prescribed number of times, and
clear a count of the number of times when the vehicle speed exceeds the first threshold value.

2. The vehicle engine stop control device according to claim 1, wherein
the controller is further programmed to set the first threshold value to a vehicle speed value which would not be reached during travel in traffic congestion with repeated starting/stopping of the vehicle.

3. The vehicle engine stop control device according to claim 2, wherein
the controller is further programmed to set the second threshold value to a vehicle speed value that is below the first threshold value and above the automatic stop permission vehicle speed such that the second threshold value will be experienced by the vehicle during travel in a traffic congestion with repeated starting/stopping of the vehicle.

4. The vehicle engine stop control device according to claim 3, wherein
the controller is further programmed to receive traffic information about a congestion degree and to increase the prescribed number of times as the congestion degree is lighter.

5. The vehicle engine stop control device according to claim 3, wherein
the controller is further programmed to receive information about selection of an eco-drive mode, and to increase the prescribed number of times when the eco-drive mode is selected as compared to when the eco-drive mode is not selected.

6. The vehicle engine stop control device according to claim 2, wherein
the controller is further programmed to receive traffic information about a congestion degree and to increase the prescribed number of times as the congestion degree is lighter.

7. The vehicle engine stop control device according to claim 2, wherein
the controller is further programmed to receive information about selection of an eco-drive mode, and to increase the prescribed number of times when the eco-drive mode is selected as compared to when the eco-drive mode is not selected.

8. The vehicle engine stop control device according to claim 1, wherein
the controller is further programmed to receive information about selection of an eco-drive mode, and to increase the prescribed number of times when the eco-drive mode is selected as compared to when the eco-drive mode is not selected.

9. A vehicle engine stop control device for a vehicle equipped with an engine, as a drive source, capable of being restarted, the vehicle engine stop control device comprising:
a controller programmed to execute a coast stop control configured
to stop the engine automatically during travel when a vehicle speed of the vehicle becomes equal to or smaller than an automatic stop permission vehicle speed and to restart the engine when a restart condition is established after the engine has been stopped automatically, and, after restart of the engine, to prohibit the engine from being stopped automatically until the vehicle speed of the vehicle exceeds a first threshold value, and
after the restart of the engine and prior to the vehicle speed exceeding the first threshold value, to withhold prohibiting the engine from being stopped automatically up to a prescribed number of times when the vehicle speed becomes equal to or smaller than the automatic stop permission vehicle speed after the vehicle speed has exceeded a second threshold value, the second threshold value being smaller than the first threshold value and larger than the automatic stop permission vehicle speed,
the controller being further programmed to set the first threshold value to a vehicle speed value that would not be reached during travel in traffic congestion with repeated starting/stopping of the vehicle,
the controller being further programmed to set the second threshold value to such a vehicle speed value that the second threshold value will be experienced by the vehicle during travel in traffic congestion with repeated starting/stopping of the vehicle, the controller being further programmed to receive information about selection of an eco-drive mode and to set the second threshold value to a lower vehicle speed value when the eco-drive mode is selected than when the eco-drive mode is not selected.

10. The vehicle engine stop control device according to claim 9, wherein the controller is further programmed to receive traffic information about a congestion degree and to increase the prescribed number of times as the congestion degree is lighter.

11. The vehicle engine stop control device according to claim 9, wherein the controller is further programmed to receive information about selection of the eco-drive mode, and to increase the prescribed number of times when the eco-drive mode is selected as compared to when the eco-drive mode is not selected.

12. A vehicle engine stop control device for a vehicle equipped with an engine, as a drive source, capable of being restarted, the vehicle engine stop control device comprising:

a controller programmed to execute a coast stop control configured to stop the engine automatically during travel and restart the engine, and, after restart of the engine, to prohibit the engine from being stopped automatically until a vehicle speed of the vehicle exceeds a first threshold value, and after the restart of the engine and prior to the vehicle speed exceeding the first threshold value, to withhold prohibiting the engine from being stopped automatically up to a prescribed number of times when the vehicle speed exceeds a second threshold value smaller than the first threshold value, the controller is further programmed to receive traffic information about a congestion degree and to increase the prescribed number of times as the congestion degree is lighter.

13. The vehicle engine stop control device according to claim 12, wherein the controller is further programmed to receive information about selection of an eco-drive mode, and to increase the prescribed number of times when the eco-drive mode is selected as compared to when the eco-drive mode is not selected.

* * * * *